Feb. 2, 1965
G. HIRS
3,168,471
FILTER APPARATUS
Filed Oct. 16, 1961
3 Sheets-Sheet 2
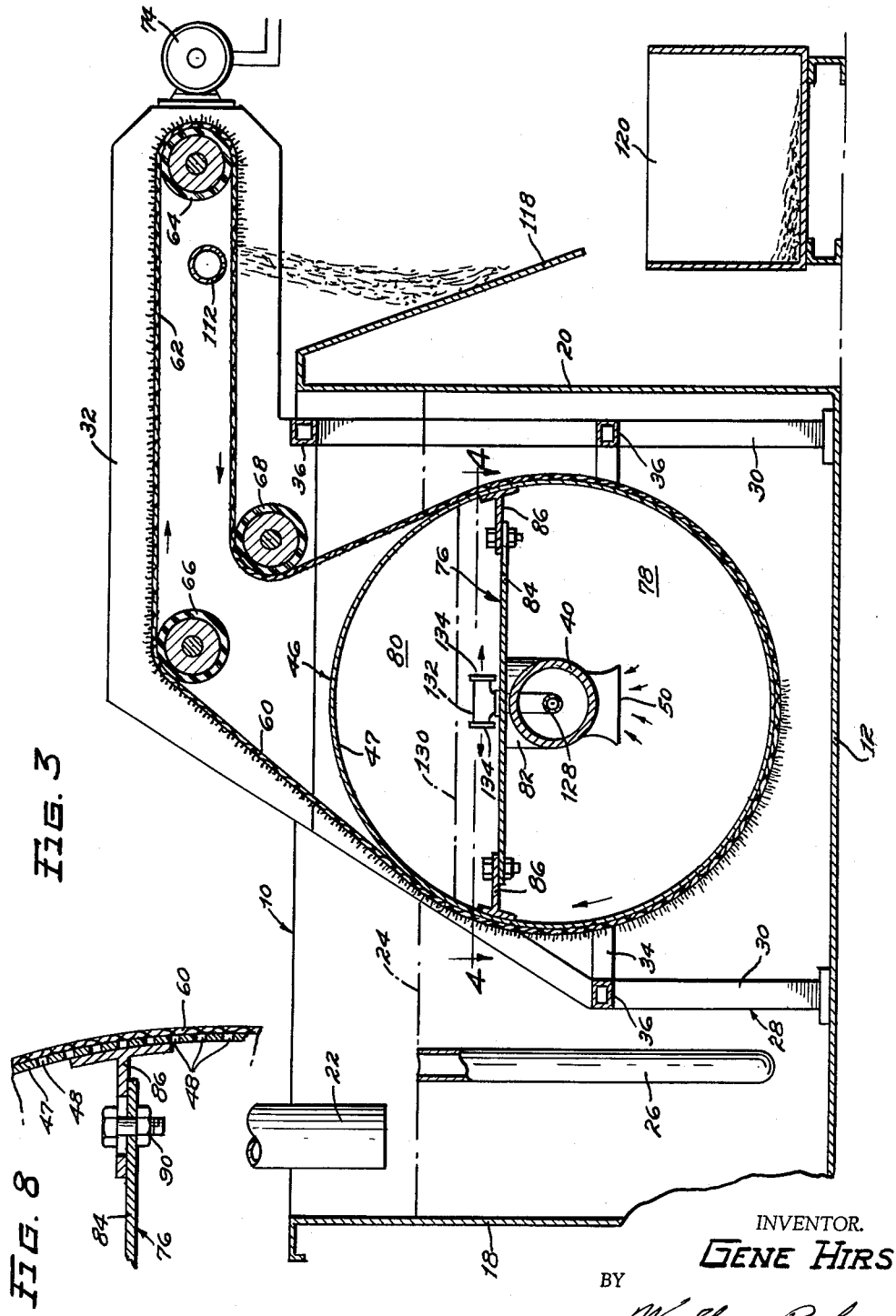
INVENTOR.
*GENE HIRS.*
BY
*Wallace P. Lamb*
ATTORNEY

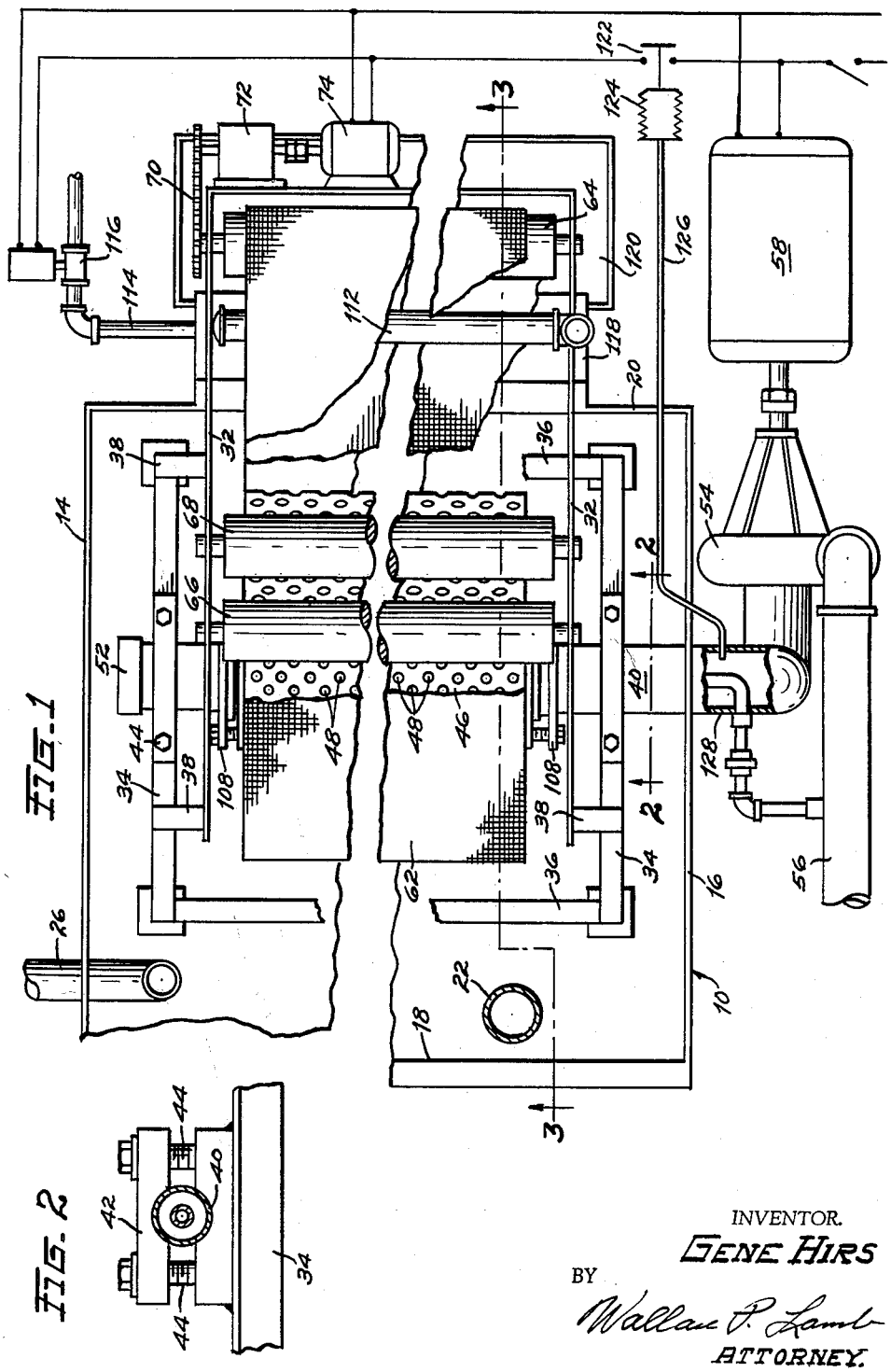

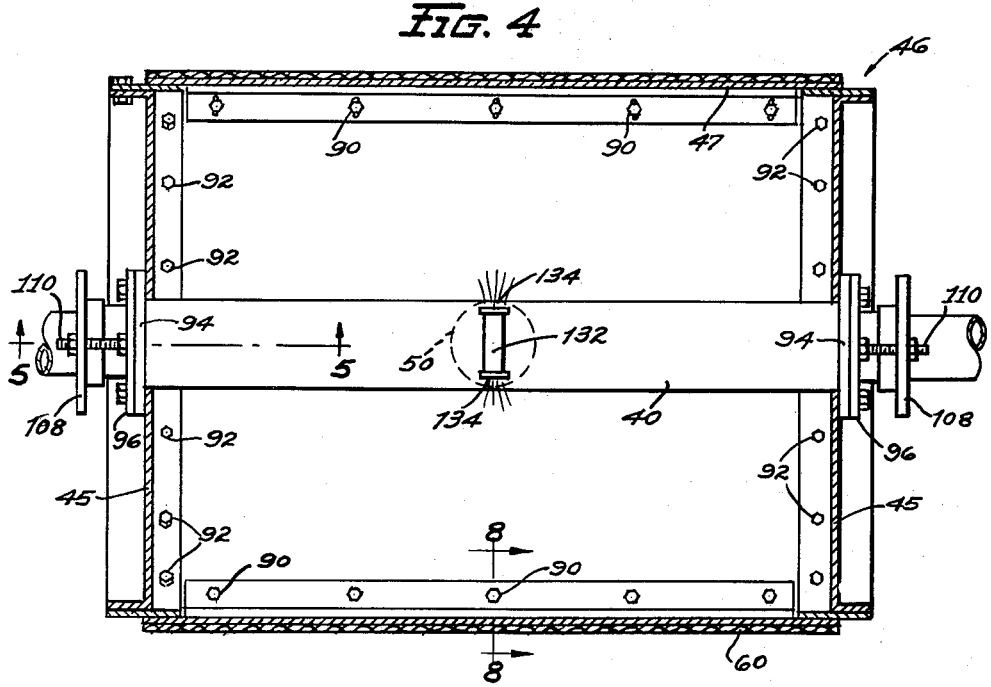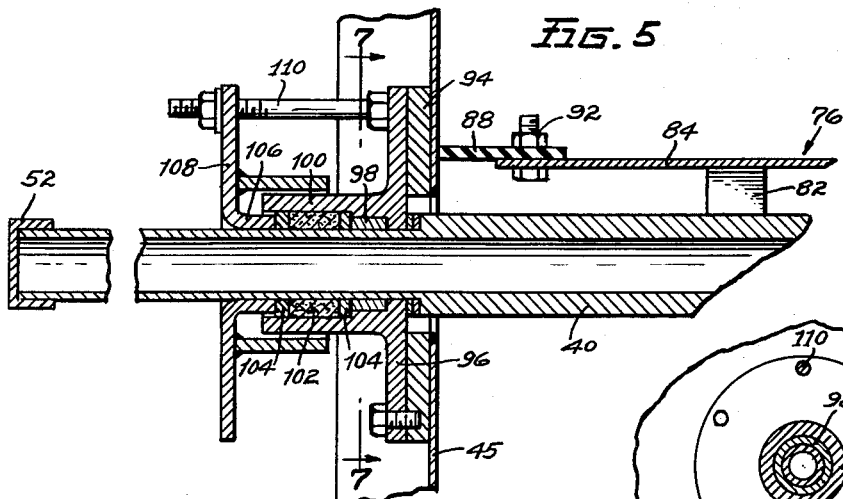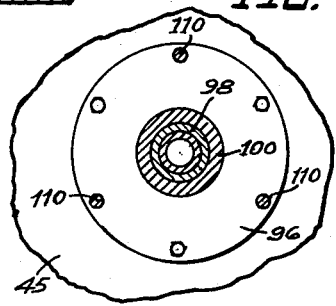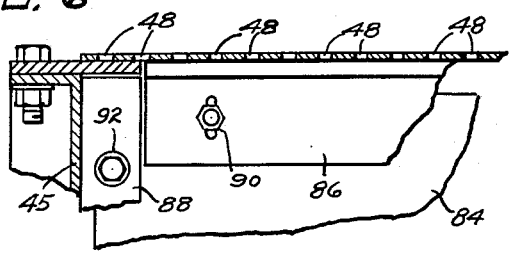

United States Patent Office 3,168,471
Patented Feb. 2, 1965

3,168,471
FILTER APPARATUS
Gene Hirs, 17208 Greenview Road, Detroit, Mich.
Filed Oct. 16, 1961, Ser. No. 145,108
4 Claims. (Cl. 210—391)

This invention relates generally to filter apparatus and particularly to liquid filter apparatus.

It is the general object of the invention to provide an improved liquid filter apparatus that is particularly suitable for filtering liquid containing a low percentage of solids of low specific gravity.

Another object of the invention is to provide a filter apparatus of the above mentioned character in which the foreign matter solids are collected on the outside of a continuous belt which is being continuously cleaned without need of interruption of the filtering operation.

More specifically, it is an object of the present invention to provide a liquid filter apparatus of the above mentioned character in which the foreign matter collecting belt has a loop portion, externally of the filter tank, that travels past a cleaning station where the belt is back washed from the inner or clean side thereof.

A further object of the invention is to provide an improved liquid filter of the above mentioned character which is relatively inexpensive to manufacture.

Other objects of the invention will become apparent from the following detail description, taken in connection with the accompanying drawings in which:

FIG. 1 is a plan view of the filter apparatus with parts broken away and in section, embodying features of the invention;

FIG. 2 is a detail cross sectional view, taken along the line 2—2 of FIG. 1;

FIG. 3 is a vertical sectional view, taken along the line 3—3 of FIG. 1;

FIG. 4 is a horizontal sectional view, taken along the line 4—4 of FIG. 3;

FIG. 5 is a vertical sectional view, taken along the line 5—5 of FIG. 4;

FIG. 6 is an enlarged fragmentary sectional detail view;

FIG. 7 is a vertical sectional view, taken along the line 7—7 of FIG. 5, and

FIG. 8 is an enlarged sectional detail view, taken along the line 8—8 of FIG. 4.

Referring to the drawings by characters of reference, the filter apparatus includes a tank 10 having a bottom wall 12, side walls 14 and 16, and end walls 18 and 20. A discharge pipe 22 discharges contaminated liquid into the tank 10 where the liquid level is maintained substantially constant, as at 24, by an overflow vertical pipe 26 from which the excess liquid may be returned to the source of the contaminated liquid.

Mounted within the tank 10 on the tank bottom wall 12 there is a supporting structure or frame 28 comprising two oppositely disposed side frame structures each including a pair of upright members or posts 30 connected together by upper oppositely disposed side plates 32 and lower horizontal frame members 34. The side frame structures may be connected together by cross members 36. As shown in FIG. 1, the side plates 32 are spaced respectively inwardly of the side frame structures by spacer members 38, the parts preferably being welded together.

Spanning and supported on the frame cross members 34 there is a stationary hollow shaft 40 which may be rigidly mounted on the cross members by clamps 42 and bolts 44, FIG. 2, or by any other suitable means. Rotatably mounted on the shaft 40 within the tank 10 there is a drum 46 which is substantially two-thirds submerged in the liquid. The drum has opposite end walls 45 apertured to receive the shaft, and a cylindrical wall 47. The cylindrical wall of the drum 46 is perforated around its periphery with small apertures 48 which are preferably arranged in closely adjacent rows parallel to the axis of rotation of the drum, the apertures, of course, establishing communication between the tank and the interior of the drum. Within the drum 46, the hollow shaft 40 is provided with a downwardly directed liquid inlet 50.

One end of the hollow shaft 40 is closed, as at 52, such as by means of a sealed cap, and the other end of the shaft is communicatively connected to the intake or suction side of a pump 54. Connected to the outlet side of the pump 54 is a pipe or conduit 56 for conducting filtrate from the pump to a point of use. A suitable electric motor 58 may be used to drive the pump 54.

In order to filter the liquid which is drawn from the tank 10 into the drum 46 there is provided a continuous, liquid pervious or porous belt 60, preferably a fine mesh wire belt, as shown. This belt travels about the drum 46 and above the drum has a horizontal loop portion 62 that projects laterally to the drum axis, externally of the tank, or such that the end portion of the loop overhangs the tank end wall 20. The loop portion 62 of the belt is guided by upper horizontally spaced apart rollers including a driven roller 64 and a guide roller 66 and about a lower intermediate roller 68. As shown in FIG. 3, the rollers 66 and 68 are arranged above the drum such that the belt 60 is tangential to the drum substantially at the liquid level. The rollers 64, 66 and 68 are journaled for rotation in the opposite side plates 32 of the frame structure and the driven roller 64 is connected to be driven through a chain drive 70, and speed reduction device 72, by an electric motor 74. The motor 74 is adapted to drive the belt 60 in the direction of the arrows.

Mounted on the hollow shaft 40 there is provided a horizontal stationary partition 76 which is below the liquid level and divides the interior of the drum 46 into a lower filter chamber 78 and an upper chamber 80. Spacer members 82 along the shaft 40 space the horizontal partition 76 above the shaft, the parts being welded or otherwise suitably secured together. The partition 76 is of composite construction comprising the partition proper or central plate 84, opposite side edge portions 86, and opposite resilient or rubber end edge strips 88 as best shown in FIGS. 5 and 6. As shown in FIG. 3, the side edge strips, which may be metal strips, are T-shaped in cross section having the legs of the T secured to opposite side margins of plate 84 and the outer surfaces or the heads of the T in close proximity to the inner surface of the drum. The heads of the T overlie at least one row of the drum apertures 48. Preferably the side edge strips 88 are secured to the plate 84 by nuts and bolts 90, the latter being received in elongated holes in the strips to provide for adjustment of the strips with respect to the inner drum surface. The end edge strips 88 are preferably rubber strips having side edges engaging the end walls of the drum, the strips being secured to the plate 84 by nuts and bolts 92.

Each end wall of the drum 46 has secured externally thereto a reinforcing plate 94 to each of which in turn is secured a mounting member 96 provided with bushings 98 for rotation on reduced end portions of the hollow shaft 40. As shown in FIG. 5, the mounting member 96 has a sleeve 100 which is coaxial with and in spaced relation to the shaft to receive packing 102 and spaced end abutment members 104. Surrounding the shaft and abutting the outer one of the abutment members 104 is a sleeve 106 formed out of a plate 108 which is drawn down by bolts 110 to displace the packing 102 to provide a liquid tight seal about the shaft.

Foreign matter that is filtered from the liquid by the filter media belt 60 is caught in the intertices of the belt on the outer side thereof, as illustrated in FIG. 3, and to clean the belt of such foreign matter I provide for a backwashing of the belt from the inner or relatively clean side of the belt loop portion 62. To accomplish this, an air manifold 112 is positioned between the upper lead side of the belt loop portion 62 and the lower trailing side of the loop and has down directed air outlets or jets which blow through and clean the belt. The manifold 112 extends transversely of the belt and may be suitably supported on the side plates 32 of the frame structure. One end of the manifold 112 is connected by a pipe 114 to a source of compressed air, steam or other fluid and a normally closed solenoid valve 116 may be provided in pipe 114. Below the loop portion 62 of the belt a deflector 118 may be provided to direct the foreign matter dislodged from the belt into a container 120.

It will be apparent that, if desired, the belt 60, as well as the pump 54, and backwashing air jets could be in operation continuously, if desired, but in the interests of efficiency, I prefer to operate them under the control of a pressure responsive switch 122, FIG. 1. This switch is electrically connected to control operation of the belt drive motor 74 and of the solenoid valve 116. The switch 122 is illustrated as having a pressure responsive actuator or bellows 124, connected in communication by a conduit 126 to the hollow shaft 40. Thus, as the filter rate is decreased as foreign matter builds up on the filter belt 60, a point is reached where the decreased pressure in the filter chamber 78 causes switch 122 to close which energizes motor 74 and opens solenoid valve 116. In order to reduce materially the drawing of air by the pump 54 from the upper chamber 80 past the partition strips 86 and 88 into the filter chamber 78, I supply clean liquid or filtrate to the upper chamber 80 which liquid cooperates with the partition strips to seal the joints formed with the inner wall surfaces of the drum 46. To accomplish this, I connect the chamber 80 to the filtrate conduit 56 by a small flow capacity pipe 128 to maintain a supply of the clean liquid in chamber 80 at about the level indicated at 130, FIG. 3. The pipe 128 is arranged to pass longitudinally through the hollow shaft 40 into the drum 46 and then upwardly through the horizontal partition 76 into chamber 80 wherein a fitting 132 is provided having a fluid tight connection with the partition and oppositely directed outlets 134.

*Operation*

As previously mentioned, when the filter apparatus is in use the line switch is, of course, closed and the pump 54 operates continuously. The pump 54 causes the liquid in tank 10 to flow through the filter belt 60 into the drum 46 and hollow shaft 40 to the pump which delivers the filtrate to a point use through supply conduit 56. Some of the filtrate conducted through the relatively small pipe 128 to the upper chamber 80 of the drum whence the liquid is drawn down into the filter chamber 78 past the partition strips 86, 88 to seal the joints between these strips and the inner surface of the drum against passage of air. As the deposit of foreign matter on that part of belt 60 that is in contact with the drum 46 builds up, it serves as a filter aid. However, the filter rate decreases as the foreign matter build up on the belt with accompanying decrease in pressure in the filter chamber and so the pressure switch 122 is set to close when the decreasing pressure reaches a calculated pressure indicative of inefficient filtering operation. The closing of the switch 122 starts the belt driving motor 74 and at the same time energizes the solenoid 116 to effect air discharge from the jets of the compressed air manifold 112. Thus, as the motor 74 drives the belt 60, air jets from manifold 112, directed from the clean side of the belt loop 62, dislodge the foreign matter from the trailing side of the belt, the cleaned portion then proceeding around the drum. This clean belt portion allows an increase in the filter rate with accompanying increase in pressure in chamber 78 and when this pressure reaches the predetermined pressure, switch 122 opens to stop motor 74 and close the air controlling solenoid valve 116.

While I have shown and described my filter apparatus in considerable detail, it will be understood that many changes and variations may be made therein without departing from the spirit and scope of the invention.

What I claim is:

1. In the filter apparatus, a tank to which contaminated liquid to be filtered is delivered, means to maintain said liquid at a substantially constant level, supporting means, a drum rotatably mounted on said supporting means within said tank, said drum being partially submerged within the liquid and having only its cylindrical wall perforated, a wall located interiorly of said drum at a level below said level of liquid in said tank, and sealingly engaging the walls of said drum to subdivide the drum interior into upper and lower compartments, a suction pump having its intake in communication with said lower compartment interiorly of said drum, means for operating said pump, a continuous and liquid pervious filter belt extending completely around the lower compartment of said drum to filter solids from the contaminated liquid as the liquid passes radially from said tank through said belt and said perforated drum wall into said lower compartment, guide means above said drum guiding a loop portion of said belt laterally of the axis of rotation of said drum to a location external to said tank, and a manifold in communication with a source of fluid under pressure arranged above the lower side of said loop portion and directed downwardly thereonto to dislodge foreign matter from the lower portion of said loop portion.

2. In a filter apparatus, a tank into which liquid to be filtered is supplied, means to maintain said liquid at a substantially constant level, supporting means, a drum rotatably mounted on said supporting means within said tank, said drum having a cylindrical wall and radial end walls partially submerged in the liquid and having perforations in its cylindrical wall only for accommodating the flow of liquid from said tank into said drum, a suction pump have its intake connected communicatively to the interior of said drum, means for driving said pump, a continuous and liquid pervious filter belt extending around the submerged portion of the drum to filter solids from the liquid, guide means above said drum guiding a loop portion of the belt horizontally and laterally from the axis of rotation of said drum above and outwardly of said tank, means operable to dislodge the solids from said loop portion, means operatively connected to drive said belt to move the filtered out solids to said dislodging means and to return the clean belt to said drum, a horizontal stationary partition within said drum located beneath the level of liquid in said tank and sealingly engaging the cylindrical wall and the end walls of said drum to subdivide the interior thereof into a lower filter chamber and an upper sealing chamber, and a supply conduit connecting the discharge side of said pump with said upper chamber to introduce filtrate thereinto, thereby aiding and sealing the partition by decreasing the passage of air between the partition and the inner surfaces of said drum walls.

3. In a filter apparatus, a tank to which liquid to be filtered is delivered, means to maintain said liquid at a substantially constant level, supporting means, a hollow shaft mounted on said supporting means, a drum mounted on said shaft for rotation within said tank and having its cylindrical wall perforated, said hollow shaft having an inlet within said drum and an outlet without said drum, a partition sealingly engaging the interior of said drum and vertically located between said liquid level and said shaft, said partition dividing the drum interior into separate upper and lower compartments, a continuous and liquid pervious filter belt having a loop portion extending around and in contact with the complete periphery of said lower compartment, said belt having a second loop portion above and extending laterally of the axis of rotation of said drum to project outwardly of said tank, guide means including a driven roller to guide said second loop portion, a suction pump having its inlet in communication with said hollow shaft, and means for driving said pump to effect liquid flow from the tank through that portion of said belt contacting the periphery of said lower compartment and into said lower compartment for flow through said shaft inlet into the shaft.

4. In a filter apparatus as defined in claim 3 means for introducing filtrate from said pump into said upper compartment to form a liquid seal at the juncture of said partition and the interior of said drum.

References Cited in the file of this patent

UNITED STATES PATENTS

| | | |
|---|---|---|
| 736,596 | Grondahl | Aug. 18, 1903 |
| 916,481 | Noyes | Mar. 30, 1909 |
| 2,614,102 | Scholosser et al. | Oct. 14, 1952 |
| 3,012,677 | Hungate | Dec. 12, 1961 |

FOREIGN PATENTS

| | | |
|---|---|---|
| 509,930 | Germany | Oct. 14, 1930 |